AIRCRAFT PAYLOAD COMPUTER

Original Filed Nov. 27, 1957 4 Sheets-Sheet 1

INVENTOR.
ARCHIE J. CLAPP, JR.
BY J. A. O'Connell
Paul M. Klein Jr.
ATTORNEY

AIRCRAFT PAYLOAD COMPUTER

Original Filed Nov. 27, 1957 4 Sheets-Sheet 2

FIG_3

STEP 1
ROTATE MOVABLE SCALE UNTIL APPLICABLE PRESSURE ALTITUDE MARK ON SCALE A COINCIDES WITH APPLICABLE AIR TEMPERATURE LINE ON CHART A. INTERPOLATE WHEN APPROPRIATE. WITHOUT CHANGING POSITION OF MOVABLE SCALE IN RELATION TO COMPUTER BASE TURN COMPUTER BASE IN HANDS APPROXIMATELY 90 DEGREES COUNTERCLOCKWISE.

FIG_2

NOTE TAKE-OFF HEADWIND MARK ON CHART C WHICH APPEARS CLOSEST TO ZERO MARK ON SCALE C APPLICABLE TAKE-OFF ALLOWABLE GROSS WEIGHT AT WHEN APPROPRIATE. READ ALLOWABLE MARK ON SCALE C AND INTERPOLATE WITH ARROWHEAD LOCATED AT FOOT OF SCALE C COINCIDES WITH ARROWHEAD LOCATED IN BOX E. ENTER THIS NUMBER

FIG_4

STEP 2
WHICH APPEARS CLOSEST TO ZERO MARK ON SCALE B. ROTATE MOVABLE SCALE UNTIL THAT LINE COINCIDES WITH APPLICABLE DEW POINT MARK ON CHART B. ROTATE MOVABLE SCALE B INTERPOLATE WHEN APPROPRIATE. WITHOUT CHANGING BASE POSITION OF MOVABLE SCALE IN RELATION TO COMPUTER BASE TURN COMPUTER BASE IN HANDS APPROXIMATELY 90 DEGREES COUNTERCLOCKWISE.

INVENTOR.
ARCHIE J. CLAPP, JR.
BY J. A. O'Connell
Paul M. Klein Jr.
ATTORNEY

AIRCRAFT PAYLOAD COMPUTER

Original Filed Nov. 27, 1957 4 Sheets-Sheet 3

INVENTOR.
ARCHIE J. CLAPP, JR.
BY J. A. O'Connell
Paul M. Klein Jr.
ATTORNEY

AIRCRAFT PAYLOAD COMPUTER

Original Filed Nov. 27, 1957 4 Sheets-Sheet 4

FIG_ 7

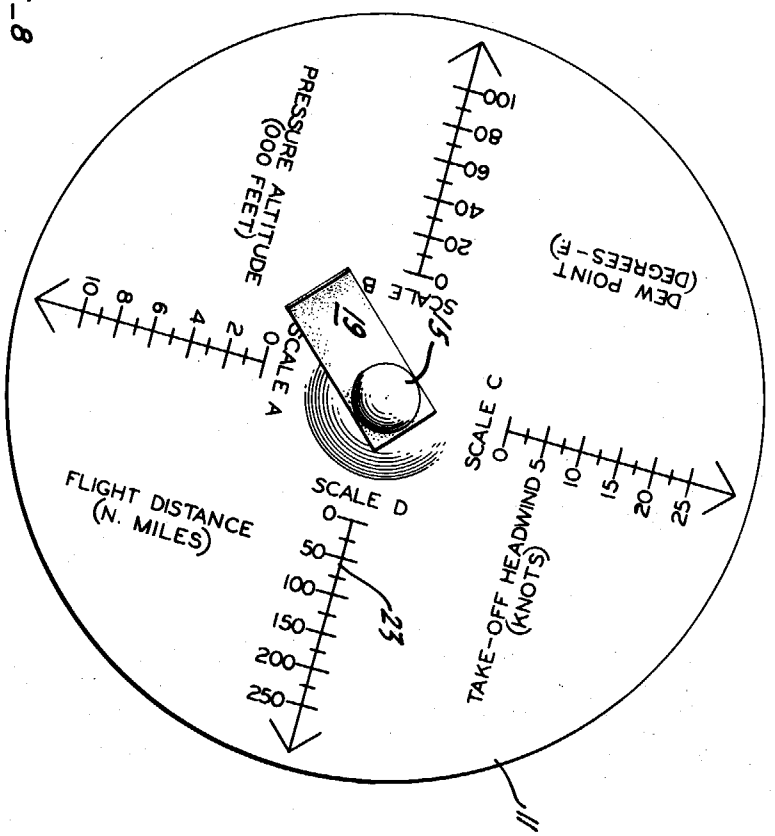

FIG_8

| | | | | | |
|---|---|---|---|---|---|
| PRESSURE ALTITUDE (FT.) | | A | ALLOWABLE GROSS WEIGHT (LBS) | | E |
| AIR TEMPERATURE (DEGREES-F.) | | B | TOTAL PARASITE WEIGHT (LBS) | | J |
| DEW POINT (DEGREES-F.) | | C | ZERO RANGE PAYLOAD (LBS) | | K |
| TAKE-OFF HEADWIND (KTS) | | D | FUEL REQUIRED (GOING/RETURN) (LBS) | | O |
| EMPTY HELICOPTER WEIGHT (LBS) | | F | TOTAL FUEL REQUIRED/TRIP (LBS) | | P |
| CREW & EQUIPMENT (LBS) | | G | ALLOWABLE PAYLOAD/TRIP (LBS) | | Q |
| OIL & TRAPPED FUEL (LBS) | | H | FLT. DURATION (GOING/RETURN) (HRS) | | R |
| RESERVE FUEL (LBS) | | I | TOTAL FLIGHT DURATION/TRIP (HRS) | | S |
| TOTAL PARASITE WEIGHT (LBS) | | J | | | |
| FLIGHT DISTANCE (N.MI.) | | L | | | |
| AV. WIND ENROUTE (DIR./VEL.) | | M | | | |
| EST. GRD. SPEED (GOING/RETURN) (KTS) | | N | | | |

3

INVENTOR.
ARCHIE J. CLAPP, JR.
BY J. A. O'Connell
Paul M. Klein Jr.
ATTORNEY

United States Patent Office

Re. 25,041
Reissued Sept. 19, 1961

25,041

AIRCRAFT PAYLOAD COMPUTER

Archie J. Clapp, Jr., 5411 Littleford St., Springfield, Va.

Original No. 2,867,381, dated Jan. 6, 1959, Ser. No. 699,426, Nov. 27, 1957. Application for reissue Apr. 29, 1959, Ser. No. 809,895
6 Claims. (Cl. 235—61)
(Granted under Title 35, U.S. Code (1952), sec. 266)

Matter enclosed in heavy brackets [ ] appears in the original patent but forms no part of this reissue specification; matter printed in italics indicates the additions made by reissue.

The invention described herein may be manufactured and used by or for the Government of the United States of America for governmental purposes without the payment of any royalties thereon or therefor.

This invention relates to computers for computing allowable payload for aircraft and more particularly for helicopters.

Heretofore known methods of computing allowable payload for a contemplated flight of an aircraft such as a helicopter involved sequential use of a plurality of charts, computations, and transfer of information from one chart to the next. This procedure is time-consuming and offers opportunities for error. An object of the present invention therefore is to provide a computer from which the allowable payload can be computed simply, rapidly, and accurately from a group of performance data charts assembled as a unit, together with information on atmospheric conditions.

Other objects and many of the attendant advantages of this invention will be readily appreciated as the same becomes better understood by reference to the following detailed description when considered in connection with the accompanying drawings wherein:

FIGS. 2, 3, 4 and 5 are enlarged reproductions of the four corner legends appearing as the four steps in the device of FIG. 1;

FIG. 7 is a top view of the complete indicating member of the device of FIG. 1; and FIG. 8 is an enlarged view of the recording boxes in the lower portion of the base member of the device of FIG. 1.

Reference is now made to the drawings. Numeral 1 indicates a base member which can be made of stiff pasteboard or the like or any other suitable material. Conveniently at one end thereof there are printed labeled boxes as shown at 3 in FIGS. 1 and 8 in which can be entered the essential items used in performing the computations and in which the results can be recorded.

The boxes are printed on a material covering the base member and associated with a surface which will take pencil wrting and from which the writing can be erased without damaging the surface. One convenient arrangement is to print the boxes on the upper surface of the base member and then cover the printed portion with a transparent durable plastic sheet having a matte finish which will accept pencil and from which pencil markings can be erased without damage to the plastic.

Figure 1:
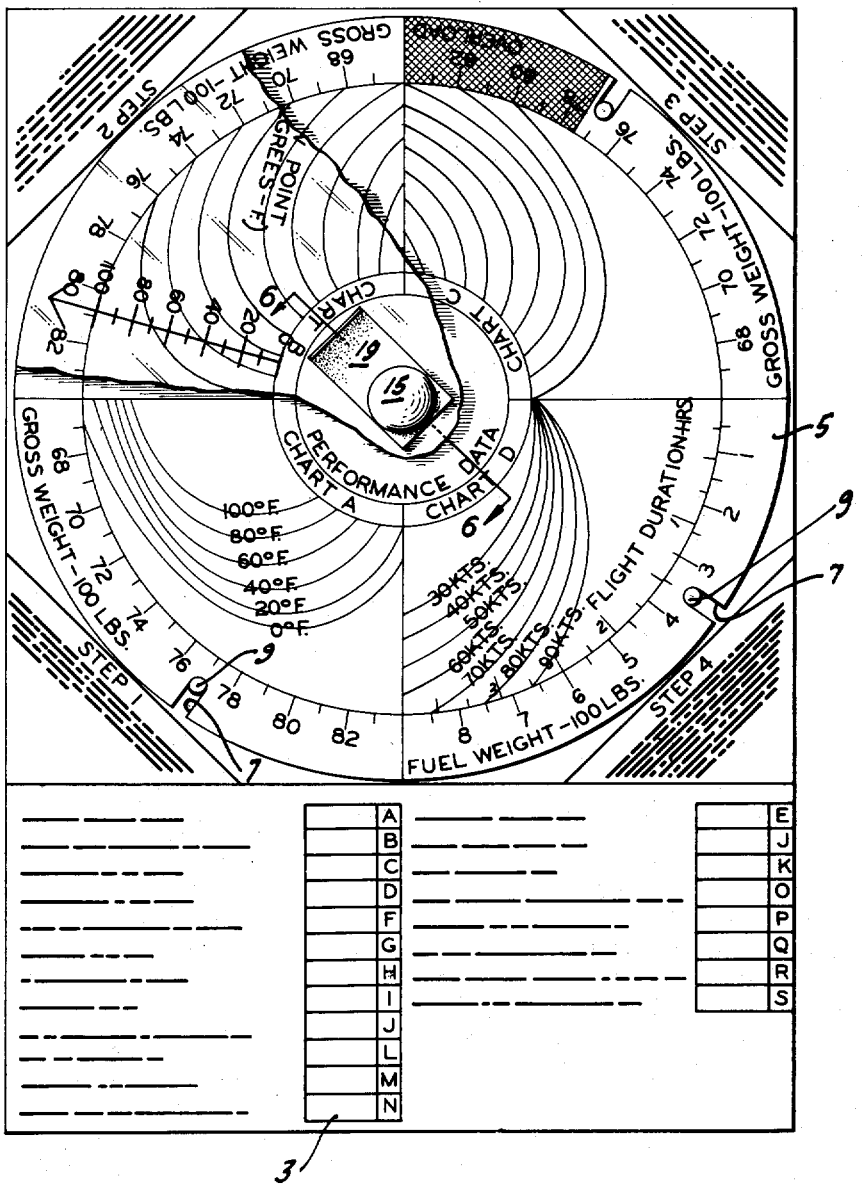
FIG. 1 is a top view of the completely assembled computer with the indicating member partially broken away for clarity and with the instructional indicia indicated schematically by dash lines.
Figure 5:
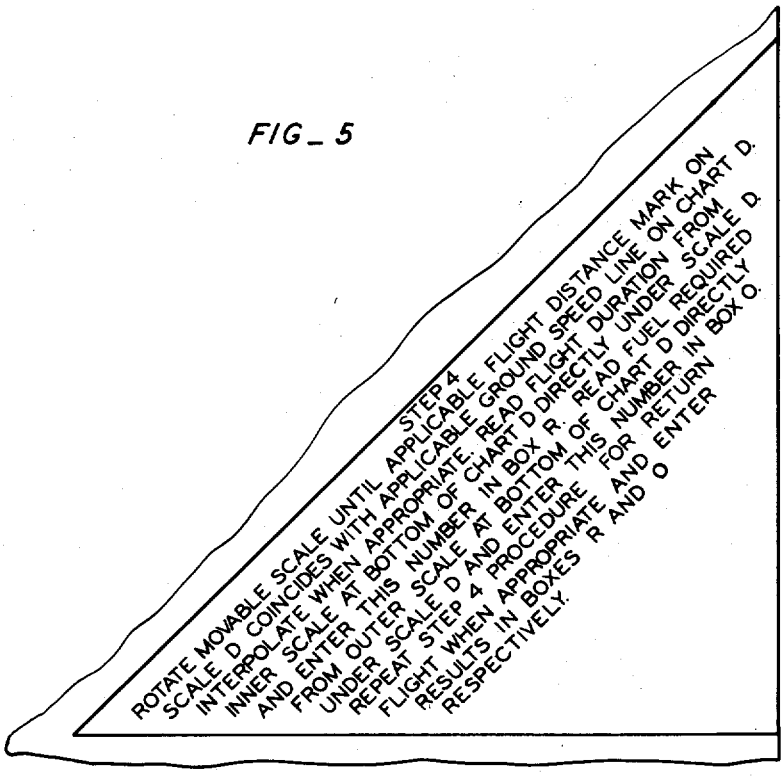

In the four quadrants of a circular region the base member 1 carries a plurality of curves of performance data for an aircraft such as a helicopter, each set of curves lying, respectively, in one of the four quadrants. Very conveniently this can be accomplished by describing the sets of curves on a performance data member 5 which can be simply a disc of paper or the like adapted to be mounted on or attached to the base member 1. Preferably, the performance data member 5 is made detachable from and attachable to the base member 1 so that the instrument is made versatile for use with a variety of different aircraft by simply attaching to the base member a performance data member for the particular aircraft to be flown. Preferably means are provided to insure that when the performance data member and the base member are assembled together, they are always uniquely oriented relative to each other. A simple way of doing this is shown in FIG. 1 wherein an asymmetrical arrangement of notches 7 is provided in the disc 5 to coact with locating projections 9 extending upward from the base member 1.

Figure 6:
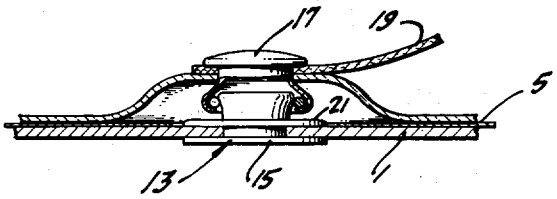
FIG. 6 is a fragmentary view partially in cross-section taken along the line 6—6 in FIG. 1.

An indicating member 11 is arranged to be rotatable relative to the performance data member. A convenient construction facilitating the use of detachable performance data members is shown in FIGS. 1, 6 and 7 wherein a snap fastener generally indicated at 13 is used to hold the three members in assembled relation while permitting relative rotation of the indicating member 11 with respect to the other members. One of the elements of the snap fastener, in the illustration the male member 15, is firmly fixed to the base member 1 while the other element of the snap fastener, in the illustration the female member 17, is fixed to the indicating member 11. To facilitate pulling the fastener apart to disassemble the instrument, a tab of leather or the like 19 is provided.

To assemble the instrument for use, a performance data member or disc for the aircraft to be flown is placed on top of the base member 1 with the locating means 7 and 9, or their equivalent, properly in engagement. To facilitate this part of the assembly a central hole is provided in the disc 5 big enough to encompass the flange 21 of the snap fastener 13 so that the disc 5 can lie flat against the base member 1. After this step the indicator disc 11 is snapped into position thus retaining the three members in assembled relation.

To use the device, the instructions set forth in the four steps shown in FIGS. 2 through 5 are followed in the numbered sequence. Since the use of the instrument requires the observation of the junction of the indicia on the indicator disc with the indicia on the performance data charts, the members must be arranged to provide sufficient visibility to accomplish this. In the embodiment chosen for illustration, this visibility is achieved by making the indicating member 11 of transparent material while the performance data charts are inscribed, as it happens, on opaque material. Satisfactory results could be achieved by having the performance data charts on transparent members while the indicator markings were on an opaque member or by having, for example, slots on an opaque indicator member along the lines of the radial markings 23 through which slots the junction of the scale markings on the indicator with the indicia on the performance data charts could be observed.

The indicator member 11 has four radial markings quadrantally disposed and extending from the axis of rotation which is the same axis about which are laid out the quadrantally spaced sets of performance data curves on the performance data member.

As will appear from FIGS 1 through 5, the performance data are shown in the form of polar coordinate curves. Chart A exhibits curves showing the effect on allowable gross weight of air temperature. Chart B exhibits curves showing the effect on allowable gross weight of dew point. Chart C shows the effect on allowable gross weight of take-off headwind velocity. Chart D exhibits curves showing the effect on flight duration and fuel weight of the ground speed of the craft. The curves in the four charts are plotted using any suitable units. Typically degrees Fahrenheit are used for temperature and knots are used for velocity although any suitable unit for each of these quantities can be chosen. The radial markings on the scales A through D on the rotatable indicator member 11 cooperating with their similarly lettered charts are laid out in commonly accepted units although, again, any desired units could be chosen. Scale A, the altitude marking, is calibrated in pressure altitude in thousands of feet; scale B lists the dew point temperature in degrees Fahrenheit; scale C is calibrated in knots for take-off headwind velocity; and scale D is calibrated in nautical miles for flight distance. The results of a computation accomplished by properly superimposing the scale marking on indicator member 11 upon its corresponding set of curves on its respective chart are read by observing the juncture of the radial indicator marking with an arcuate answer scale described about the axis of the instrument. Conveniently, to provide the greatest reading accuracy, the arcuate answer scales are described near the periphery of the performance data member.

OPERATION

In using the device to perform a computation, the listed steps are performed in sequence as follows. The member 11 is rotated until the pressure altitude mark on scale A coincides with the applicable air temperature line on chart A, using interpolation when appropriate. Without changing the position of the member 11 relative to the base member 1, the entire instrument is turned in the hands approximately 90° counterclockwise. Next, the dew point curve on chart B is noted which appears closest to the zero mark on scale B. Thereafter, the member 11 is rotated until that curve coincides with the applicable dew point mark on scale B, using interpolation where appropriate. Again without changing the position of the indicator member 11 relative to the base member 1, the computer is turned about 90° counterclockwise. Now the take-off headwind curve on chart C is noted which appears closest to the zero mark on scale C. Then the member 11 is rotated until that curve coincides with the applicable take-off headwind mark on scale C, interpolating when appropriate. The allowable gross weight can now be read at the juncture of scale C with the arcuate scale on chart C labeled "gross weight" and located near the arrowhead at the end of scale C. This allowable gross weight can be inserted in box E shown in FIG. 8.

The required amount of fuel and the duration of the flight can be computed from chart D and scale D by rotating the member 11 until the applicable flight distance mark on scale D coincides with the applicable ground speed line on chart D, interpolating when appropriate. The flight duration can then be read directly on the "flight duration" scale on chart D and the fuel amount, shown conveniently as weight, can be read directly from the "fuel weight" scale on chart D. For convenient reference the flight duration can be entered in box R in FIG. 8 and the remaining boxes filled in with appropriate entries; for example, the zero range payload in box K is obtained by subtracting the total parasite weight in box J from the allowable gross weight in box E, and the allowable payload in box Q is obtained by subtracting the fuel required in box P from the zero range payload in box K.

It should be noted that since the several indicator markings are mounted on the same member 11 the motion of the member 11 to take account of the effect of one parameter automatically moves the other radial markings relative to their respective scales. Thus, for example, when one proceeds to scale B and its associated chart B to perform the computation of the adjustment of allowable gross weight to account for the effect of dew point, one is initially provided as a starting point with an allowable gross weight which has already automatically been adjusted for the effect of air temperature. Thus, the mental or manual transfer of computations from one chart to another, with its accompanying possibility of error, is avoided by this invention. It may further be noted that although it is the ultimate allowable gross weight which is of concern and which requires thus an answer scale labeled "gross weight" on only scale C, nevertheless, for information purposes, gross weight scales are also laid out on charts A and B so that one can observe the effect of each parameter as the sequential computing steps are performed.

Obviously many modifications and variations of the present invention are possible in the light of the above teachings. It is therefore to be understood that within the scope of the appended claims, the invention may be practiced otherwise than as specifically described.

What is claimed is:

1. A computer for helicopters comprising a base member having four sets of curves fixedly carried thereby, said four sets being disposed each, respectively, in a different one of the four quadrants of the same circular region; one of said sets showing the effect of temperature on allowable gross weight; a second one of said sets showing the effect of dew point on allowable gross weight; the third one of said sets showing the effect of take-off headwind on allowable gross weight; the fourth one of said sets showing the effect of ground speed on flight duration and required amount of fuel; and a second member serving as an indicating member mounted for rotation relative to said first member about an axis perpendicular to and passing through the center of said circular region; said second member having four quadrantally spaced markings radially extending from said axis, each arranged to cooperate, respectively, with one of said sets of curves; one of said radial markings being calibrated in altitude and cooperating with said first set of curves; another of said markings being calibrated in dew point temperatrue and cooperating with said second set of curves; the third one of said markings being calibrated in take-off headwind velocity and cooperating with said third set of curves; the quadrant containing said third set of curves being provided with an arcuate scale described about said axis and calibrated in gross weight; the juncture of said third radial marking with said arcuate scale indicating the allowable gross weight of the helicopter; the fourth radial marking being calibrated in flight distance and cooperating with said fourth set of curves; the quadrant containing said fourth set of curves being provided with arcuate scales described about said axis and calibrated in flight duration and amount of fuel; the flight duration and amount of fuel required being indicated by the juncture of said fourth radial marking with said last-mentioned scales.

2. The device of claim 1 wherein sufficient visibility is provided among the several components to facilitate seeing the juncture of said radial markings with their respective curves and arcuate scales.

3. The device of claim 1 wherein said curves and arcuate scales are provided on a performance data member detachable from and attachable to said base member; said detachable member and said base member having cooperating locating means to insure unique relative orientation of said two last mentioned members when they are assembled together, whereby different performance data members for different aircraft can be used with the same base member and indicating member.

4. The device of claim 3 wherein said performance data member is in the form of a centrally perforated disc; and said indicating member is in the form of a transparent disc superimposed on said first disc; and snap fastener means on said indicating member and base member passing through the perforation in said data member disc are used to hold said discs in assembled relation with each other and with said base member while allowing rotation of said indicating member relative to said data member.

*5. A computer for helicopters comprising a base member having a plurality of sets of curves fixedly carried thereby, said sets being disposed each, respectively, in a different sector of the same circular region; one of said sets showing the effect of air temperature on allowable gross weight; a second one of said sets showing the effect of dew point on allowable gross weight; a third one of said*

*sets showing the effect of take-off headwind on allowable gross weight and a second member serving as an indicating member mounted for rotation relative to said first member about an axis perpendicular to and passing through the center of said circular region; said second member having spaced markings radially extending from said axis, each having an index point and being arranged to cooperate, respectivly, with one of said sets of curves; one of said radial markings being calibrated in altitude and cooperating with said first set of curves; another of said markings being calibrated in dew point temperature and cooperating with said second set of curves; the third one of said markings being calibrated in take-off headwind velocity and cooperating with said third set of curves; the sector containing said third set of curves being provided with an arcuate scale described about said axis and calibrated in gross weight; the positions of said sets of curves on said base member and said markings on said indicating member being so arranged that movement of said indicating member to position a selected altitude mark to coincide with a selected air temperature curve will cause the index point of said dew point temperature marking to indicate a curve of said second set, further movement of said indicating member to position a selected dew point mark to coincide with said indicated curve will position the index point of said headwind velocity marking to designate a curve of said third set, and still further movement of said indicating member to position a selected headwind velocity mark to coincide with said designated curve will cause the junction of said third marking with said scale to indicate the allowable gross weight corresponding to the selected air temperature, altitude, dew point and headwind.*

*6. A computer for helicopters comprising a base member having a plurality of sets of curves fixedly carried thereby, said sets being disposed each, respectively, in a different one of a plurality of areas on said base member; one of said sets showing the effect of air temperature on allowable gross weight; a second one of said sets showing the effect of dew point on allowable gross weight;*

*a third one of said sets showing the effect of take-off headwind on allowable gross weight; and a second member serving as an indicating member mounted for movement relative to said first member; said second member having a plurality of spaced linear markings each having an index point and being arranged to cooperate, respectively, with one of said sets of curves; one of said linear markings being calibrated in altitude and cooperating with said first set of curves; another of said markings being calibrated in dew point temperature and cooperating with said second set of curves; the third one of said markings being calibrated in take-off headwind velocity and cooperating with said third set of curves; the area containing said third set of curves being provided with a scale along the edge thereof calibrated in gross weight; the positions of said sets of curves on said base member and said markings on said indicating member being so arranged that movement of said indicating member to position a selected altitude mark to coincide with a selected air temperature curve will cause the index point of said dew point temperature marking to indicate a curve of said second set, further movement of said indicating member to position a selected dew point mark to coincide with said indicated curve will position the index point of said headwind velocity marking to designate a curve of said third set, and still further movement of said indicating member to position a selected headwind velocity mark to coincide with said designated curve will cause the juncture of said third marking with said scale to indicate the allowable gross weight corresponding to the selected air temperature, altitude, dew point and headwind.*

References Cited in the file of this patent or the original patent

UNITED STATES PATENTS

| | | |
|---|---|---|
| 2,405,113 | Clemons et al. | Aug. 6, 1946 |

FOREIGN PATENTS

| | | |
|---|---|---|
| 404,561 | Germany | Oct. 21, 1924 |
| 557,079 | Great Britain | Nov. 3, 1943 |